Aug. 11, 1925. Re. 16,134

J. F. BJORKGREN

REGULATING MECHANISM FOR CONTROLLING THE SUPPLY OF FUEL TO INTERNAL COMBUSTION ENGINES

Original Filed Jan. 13. 1920

INVENTOR

Johan Fredrik Bjorkgren

BY his ATTORNEYS Darby & Darby

Reissued Aug. 11, 1925. Re. 16,134

UNITED STATES PATENT OFFICE.

JOHAN FREDRIK BJÖRKGREN, OF HOLMGATAN, FALUN, SWEDEN, ASSIGNOR, BY MESNE ASSIGNMENTS, TO REGULAX ENGINE CORPORATION, OF WILMINGTON, DELAWARE, A CORPORATION OF DELAWARE.

REGULATING MECHANISM FOR CONTROLLING THE SUPPLY OF FUEL TO INTERNAL-COMBUSTION ENGINES.

Original No. 1,410,360, dated March 21, 1922, Serial No. 351,158, filed January 13, 1920. Application for reissue filed May 2, 1923. Serial No. 636,260.

*To all whom it may concern:*

Be it known that I, JOHAN FREDRIK BJÖRKGREN, a subject of the King of Sweden, residing at Holmgatan 2, Falun, Sweden, have invented a certain new and useful Improvement in Regulating Mechanism for Controlling the Supply of Fuel to Internal-Combustion Engines, of which the following is a specification.

The present invention relates to an arrangement for controlling the fuel supply to internal combustion engines. The arrangement in question is extremely sensitive and always supplies the motor with a quantity of fuel exactly corresponding to the speed and load of the motor.

The invention is principally characterized by a sleeve which is mounted on to rotate with but slidable along the motor shaft or a shaft connected therewith, the said sleeve being provided with an annular groove or recess which extends obliquely with respect to the axis of the shaft, a non-rotatable ring being retained in the said groove or recess so as to be shifted back and forth on account of the oblique relation of the groove or recess, which motion is imparted to the plunger of the fuel pump, said plunger being actuated directly or indirectly by said ring. As the sleeve provided with the ring is displaced to different positions on the shaft, the relative distance is changed between the ring and the pump plunger, or between the ring and a member which actuates the pump plunger. Thus the length of stroke of the plunger and the quantity of the fuel supplied are also changed.

The displacement of the ring-carrying sleeve on the shaft takes place automatically on variations in the speed of the motor. This is due to the ring being connected with and actuated by a weight which is slidably mounted to move radially in a disk-like member attached to the shaft and acted upon by springs tending to move the weight inwardly against the action of the centrifugal force exerted thereon. The sleeve is displaced on the shaft by the action of wedges or the like, associated with the weight.

Figure 1:
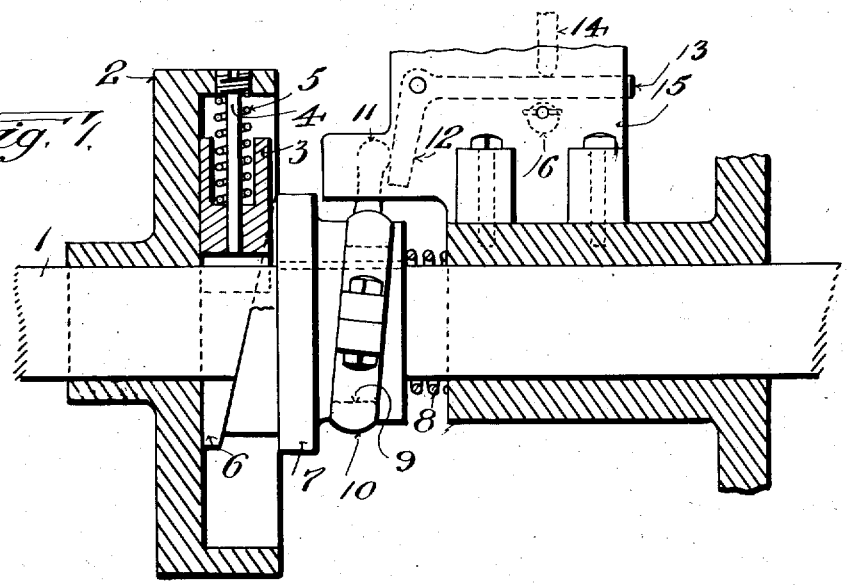
Figure 2:
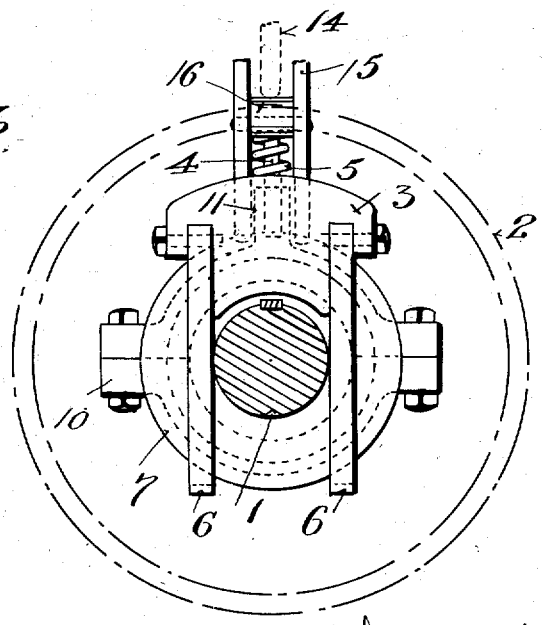

The accompanying drawing shows an embodiment of the invention by way of example, Fig. 1 being a longitudinal section of the arrangement and Fig. 2 an end view thereof.

1 is the motor shaft, attached to which is a disk-like member 2. In the latter the weight 3 is slidable in a radial direction, the same being guided by a pin 4 fastened to the disk, which pin is surrounded by a spring 5 tending to move the weight inwardly towards the axis of the disk. Attached to the weight are two wedges 6 situated one on each side of the shaft 1 and bearing against the oblique end face of a sleeve 7 which is mounted on to rotate with but is slidable along shaft 1. The sleeve 7 is engaged by a spring 8 so as to be pressed into contact with the wedges. In the sleeve 7 there is provided an oblique groove or recess which encircles the sleeve. A non-rotatable ring 10 engages in said groove or recess and is provided with a projection or arm 11 abutting against the one arm 12 of a bell-crank lever, whose other arm 13 abuts against the pump plunger 14.

In operation the ring 10 is caused to be moved back and forth on account of the oblique groove or recess 9, and its projection or arm 11 moves to and fro in the direction of the axis of the shaft, thereby actuating the bell-crank lever 12, 13 by means of which the plunger of the fuel pump is actuated. The speed of the motor being normal, the weight is kept in a normal position through the centrifugal force acting thereon, said position of the weight determining the normal position of the sleeve on the shaft, that is to say, the normal distance between the arm or projection 11 of the ring 10, and the arm 12 of the bell-crank lever. If the motor is slowing down, the weight will be displaced inwardly through the influence of the spring 5, and the wedges 6 will thereby displace the sleeve 7 on the shaft 1 towards the right in the drawing, that is to say, the arm or projection 11 of the ring 10 is brought closer to the arm 12. Thus, the period during which the arm or projection 11 acts on the arm 12 is extended, and, consequently, the length of stroke of the pump plunger, and hence the quantity of fuel supplied, will be increased in a corresponding degree. If, on the other hand, the speed of the motor increases, the conditions will be reversed, the weight then moving outwardly by the increasing centrifugal force, whereby the sleeve 7 is displaced towards the left, thus withdrawing the ring arm or projection 11 from the arm 12 so that the length of the pump stroke is diminished.

To regulate the length of the suction stroke of the pump, notwithstanding the automatic control brought about by means of the arrangement above described, there is provided in the fixed part 15, a rotatably mounted eccentric 16 adapted to be adjusted by hand, the arm 13 striking said eccentric when it moves back on the suction stroke of the plunger 14. The magnitude of this back motion of the plunger may be regulated by turning the eccentric more or less.

What I claim as new and desire to secure by Letters Patent of the United States is:

1. A regulating mechanism to control the supply of fuel for internal combustion engines, characterized by a sleeve mounted on to rotate with but slidable along a motor driven shaft, the said sleeve being provided with a recess extending obliquely with respect to the axis of the shaft, a ring engaging in said recess so as to move to and fro on account of the oblique position of the recess, and means for utilizing the movements of the ring in the operation of a fuel pump.

2. A regulating mechanism to control the supply of fuel for internal combustion engines comprising a motor driven shaft, a sleeve mounted on to rotate with but displaceable along said shaft, a non-rotatable ring mounted upon the sleeve obliquely with respect to the axis of the shaft, whereby back and forth movement of the ring is effected incident to the rotation of the shaft and sleeve, an arm carried by the ring, a lever actuated by the arm and adapted to drive a power pump, and centrifugally controlled means arranged to displace the sleeve along the shaft to vary the stroke of the lever.

3. A regulating mechanism according to claim 1 characterized by a lever actuated by the ring and an adjustable abutment coacting with the lever to limit the movement thereof.

4. In a regulating mechanism to control the supply of fuel for internal combustion engines an engine driven shaft, a sleeve mounted on to rotate with but slidable along said shaft, centrifugally operated wedging means to slide said sleeve in one direction, means to yieldingly resist the sliding movement of said sleeve, and means actuated by the sleeve and controlled by its sliding movements to control the supply of fuel to the engine.

5. In a regulating mechanism to control the supply of fuel for internal combustion engines an engine driven shaft, a sleeve mounted on to rotate with but slidable along said shaft, a spring acting on said sleeve to normally maintain it in one limit of its sliding movement on the shaft, centrifugally operated wedging means to displace the sleeve against the action of the spring, and means actuated by the sleeve and controlled by its position on the shaft to control the supply of fuel to the engine.

6. In a regulating mechanism to control the supply of fuel for internal combustion engines an engine driven shaft, a sleeve mounted on to rotate with but slidable along said shaft, a spring acting on said sleeve to normally maintain it in one limit of its sliding movement on the shaft, a radially movable centrifugally operated means having a wedge member arranged to engage said sleeve and operating to displace the same against the action of said spring, and means to utilize the displacement of the sleeve to control the supply of fuel to the engine.

7. In an apparatus of the class described, an engine driven shaft, a sleeve mounted to rotate with but slidable along said shaft, a spring operating against one end of said sleeve, a wedge member engaging the other end of said sleeve, means controlled by the speed of the engine to shift said wedge member and displacing said sleeve on the shaft, and means to utilize the displacement of said sleeve to control the supply of fuel to the engine.

8. In an apparatus of the class described, an engine driven shaft, a sleeve mounted to rotate with but slidable along said shaft, said sleeve having an inclined surface at one end thereof, a spring operating against the other end of said sleeve, a wedge member engaging the inclined end surface of said sleeve, means controlled by the speed of the engine to shift said wedge member for displacing the sleeve on the shaft, and means to utilize the displacement of the sleeve to control the speed of the engine.

9. In an apparatus of the class described, an engine driven shaft, a sleeve mounted to rotate with but slidable along said shaft, a spring operating against one end of said sleeve, a wedge member engaging the other end of said sleeve, a radially movable member connected to said wedge member and centrifugally operated by the speed of the engine to shift said wedge member and displace the sleeve on the shaft, and means to utilize the displacement of said sleeve to control the supply of fuel to the engine.

JOHAN FREDRIK BJÖRKGREN.

In the presence of—

L. Brock.